2 Sheets—Sheet 1.
W. & W. T. EADES.
Apparatus for Raising Weights.
No. 62,401. Patented Feb. 26, 1867.
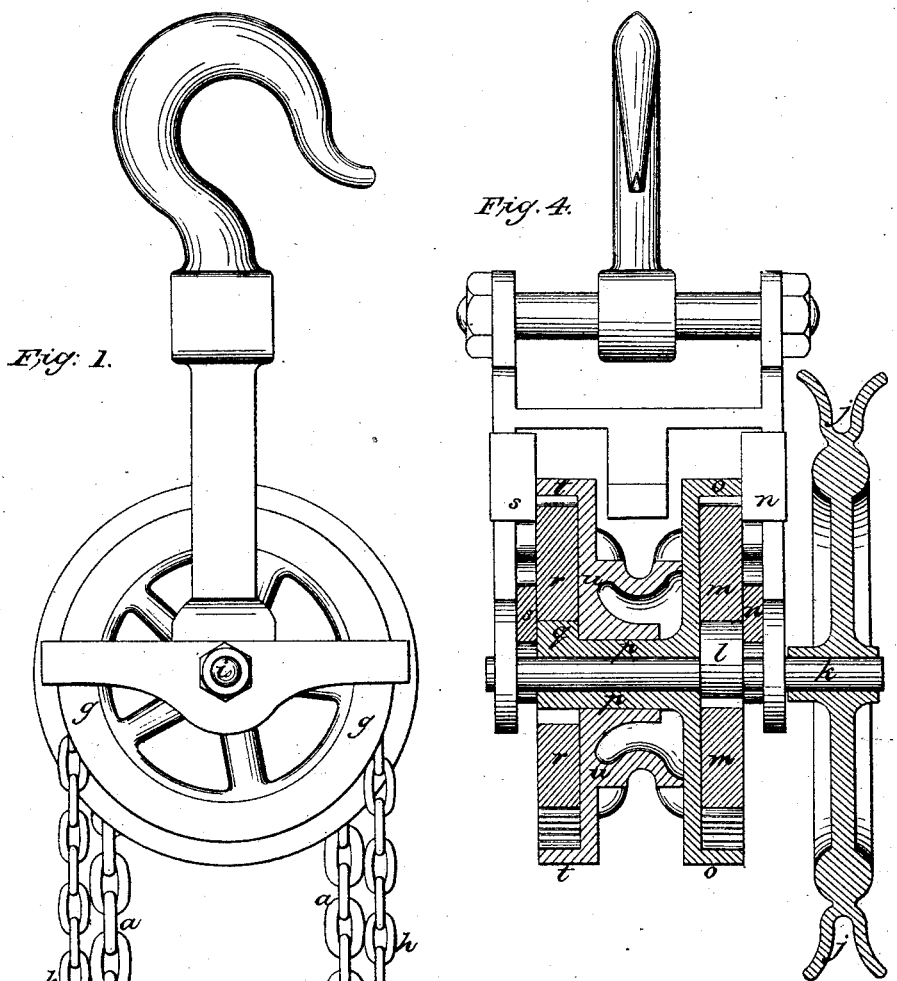

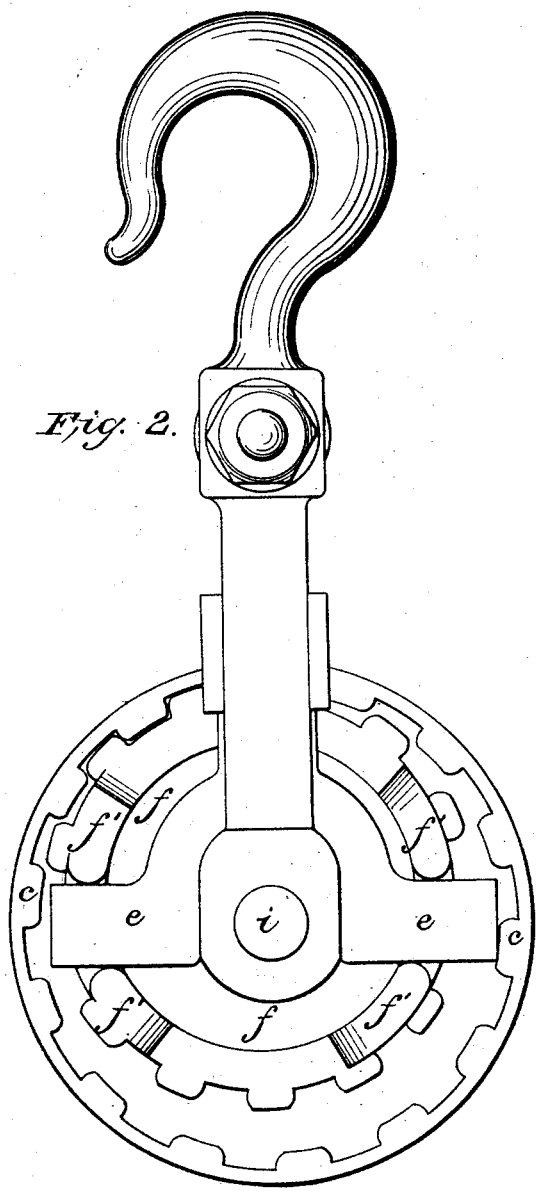
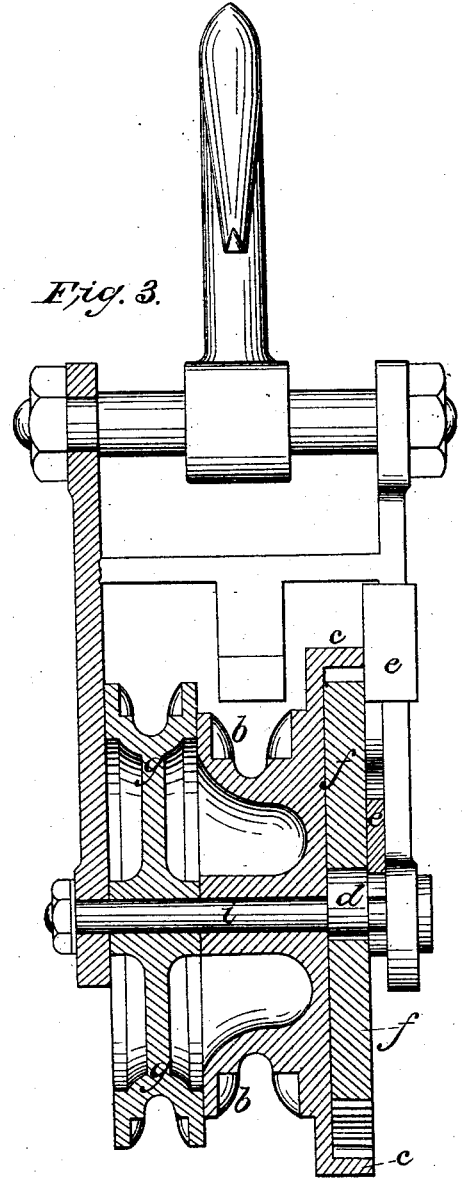

United States Patent Office.

WILLIAM EADES AND WILLIAM THOMAS EADES, OF BIRMINGHAM, ENGLAND.

Letters Patent No. 62,401, dated February 26, 1867.

IMPROVEMENT IN APPARATUS FOR RAISING WEIGHTS.

*The Schedule referred to in these Letters Patent and making part of the same.*

TO ALL WHOM IT MAY CONCERN:

Be it known that we, WILLIAM EADES and WILLIAM THOMAS EADES, of Birmingham, in the county of Warwick, England, and kingdom of Great Britain, have invented new and useful Improvements in Apparatus for Raising Weights; and we do hereby declare that the following is a full, clear, and exact description thereof, which will enable others skilled in the art to make and use the same, reference being had to the accompanying drawings, forming part of this specification.

This invention consists in an improved pulley-block, constructed after the following manner:

We employ a pulley having sinkings or chambers upon its periphery, to receive the links of a single chain, which chain hangs with both ends loose, and terminating with hooks, so that, whilst one end of the chain is on the ascent, the other is on the descent. This pulley is attached to or formed upon a toothed wheel, having cogs or teeth inside the periphery or rim of the wheel, in which cogs or teeth another toothed wheel works. This second or inside wheel has one tooth, or more than one, less than the outside wheel. The inside wheel works loose upon an eccentric, by the action of which it is caused to play within the outside toothed wheel, and, being fixed to an oscillating plate attached to the arm or side of the block, it has no circular motion. The revolution of the eccentric causes the outside toothed wheel to advance one or more teeth, and as that wheel is part of or is attached to the pulley on which the chain is worked, it causes the chain pulley to rotate with itself. The eccentric is caused to revolve by means of a pulley, worked by an endless chain, a rope, and sprocket-wheel, or any other convenient means. The toothed wheels may, if preferred, be reversed; the one formed on the chain pulley may be the smaller, the outside one working on the eccentric may be the larger.

Description of the Drawings.

Figure 1 represents an elevation of one side of the block.

Figure 2, an elevation of the opposite side.

Figure 3, a vertical section; and

Figure 4, a similar section of a compound pulley-block constructed according to our invention.

Similar letters of reference indicate like parts.

Over the pulley $b$ is worked a chain, $a$, which chain is not fastened to the pulley, but takes its hold by the links of the chain fitting into or engaging in chambers on the pulley $b$. The chain $a$ is a single chain, having two loose ends furnished with hooks. The pulley $b$ is worked by the hand-chain $h$, or by a rope which passes over the pulley $g$, and works upon that pulley in the same manner as the chain $a$ upon the pulley $b$; but the chain $h$ is a double or endless chain. The pulley $g$ is fixed upon the spindle $i$, upon which spindle is also fixed an eccentric, $d$. Upon the eccentric $d$ is hung a toothed wheel, $f$, which is kept in position by the studs $f'$ on its outer surface, engaging in the arms of the plate $e$, thus allowing a sideways motion to the wheel $f$. The plate $e$ has a vertical motion, and is kept in place by the frame of the block, and thus the toothed wheel $f$ has no circular motion, but is free to work laterally with the eccentric $d$. Motion is obtained by reason of the toothed wheel $c$, within which the toothed wheel $f$ works, having one tooth more than the wheel $f$, thus causing it, on each revolution of the eccentric, to advance one tooth. A compound pulley-block of this description can be formed, as shown in section, (fig. 4,) by repeating the toothed wheel gearing on the opposite side of the chain pulley, and employing a double spindle; and this form of pulley can be worked by an endless rope, running in the forks $j$ of a sprocket-wheel, which thus imparts motion through the eccentric $l$ and toothed wheel $m$, held by the plate $n$, as described in fig. 3, to the toothed wheel $o$, fixed upon a hollow spindle, $p$, working round the spindle $k$. Upon the spindle $p$ is fixed another eccentric, $q$, operating in exactly similar manner to that already described on the other side of the block, through the toothed wheel $r$, held in place by the plate $s$, driving the toothed wheel $t$, and thus giving motion to the chain pulley $w$ at a much reduced speed.

In applying our invention to a crane or hoist of any description, it is simply necessary to mount this improved pulley-block on the beam of the crane or hoist, and work it by means of an endless chain or band by pulley and winch-handle, or other convenient means.

Having thus described the nature of our said invention, and the manner in which the same is to be carried into effect—

We claim the within-described improved apparatus for raising weights, such apparatus consisting of a pulley-block, constructed as herein described, or any mere modification of the same construction whereby a single chain having two loose ends is carried to work over a pulley driven by self-sustaining gearing in manner herein more fully set forth and specified.

WILLIAM EADES,
WILLIAM THOMAS EADES.

Witnesses:
ELIHU BURRITT, *United States Consular Agent,*
P. BAKER FULLARD.